Patented Oct. 4, 1927.

1,644,131

UNITED STATES PATENT OFFICE.

EDWARD HOPE, OF OXFORD, ENGLAND, ASSIGNOR TO FREDERICK WILLIAM ATTACK, OF KINGSTON, CANADA.

MANUFACTURE OF GLASS OR GLASS-LIKE OBJECTS.

No Drawing. Application filed December 26, 1925, Serial No. 77,823, and in Great Britain January 26, 1925.

This invention relates to improvements in the manufacture of glass or glass-like objects. The present application is a continuation in part of application Ser. No. 15,405, filed March 13, 1925.

It has long been known that the di-alkyl esters of itaconic acid can be polymerized to form glass-like masses of high refractive index, but hitherto no commercial method of obtaining the desired result has been described. The results recorded in the literature are extremely erratic and the polymerization is always very slow; for example Anshütz, Berichte Vol. 14, page 2784, states that one preparation completely polymerized in nineteen months. Anschütz stated that he had not yet tried to hasten polymerization artificially by bromine, iodine, etc. Fittig, Annalen 331, page 174, 1903, stated that the polymerization first begins after several months.

The most complete investigation appears to have been made by Stobbe and Lippold, J. Pr. Chem. 1914, Vol. 90, page 336, who investigated the action of light on the polymerization of the ester together with the polymerization of styrol. They concluded that both reactions were autocatalytic in character and that both were strongly influenced by light. For example, one specimen of itaconic ester kept in the dark for three months was unchanged, while another specimen exposed to light became thick after sixty-five days and solid after one hundred and three days. It was stated that temperature has apparently no influence on the polymerization; at any rate the refractive index of the specimen kept for 132 hours in the dark at 100° C. had not altered.

Another sample was kept in the dark for 10 years at ordinary temperatures when it was found to become viscous.

As a result of an exhaustive investigation of the conditions of polymerization, I have now discovered that provided anticatalytic phenomena are avoided, it is possible to accelerate the reaction to a remarkable extent by heating and that exposure to light is not necessary to obtain the desired result. I find that while the presence of small quantities of acid is not prejudicial and may possibly be of advantage in some cases, the reaction is retarded if the material is kept in effective contact with certain alkaline substances, e. g. dry quicklime or certain organic bases such as piperidine. Certain samples of ordinary glass containing an alkaline base exhibit the same anticatalytic action. Thus piperidine may be used to stabilize the ester during storage.

The invention further consists in polymerizing the di-alkyl esters of itaconic acid or their derivatives by heating the material while avoiding substantial anticatalytic phenomena.

The reaction may be arrested when the viscosity of the ester has arisen e. g. to the viscosity of pure glycerine, and the partially polymerized viscous liquid may be used as a cement after which the polymerization may be completed by further heating.

The material is also useful for application in thin layers as a cement for the purpose of forming compound sheets of glass or other transparent material, especially with the interposition of flexible sheets of cellulose acetate or the like.

Example.

Two sheets of glass are united by the aid of this viscous mass as a cement to a sheet of transparent cellulose acetate. Polymerization is then completed by heating the composite sheet for three days at 70° C. when an unsplinterable sheet is produced.

Such a composite sheet consists of five layers. Further layers may be present e. g. seven if desired.

The glass may be reinforced by wire or the like if desired.

Again the partially polymerized ester may be moulded into objects for optical or other use and the polymerization may be completed after moulding when a hard transparent vitreous article is obtainable which closely resembles ordinary glass in appearance and physical properties. Or lenses and similar objects for optical purposes may be made from the previously moulded mass.

The ester or partially polymerized ester (or esters) may be used as a binding agent with which filling materials may be incorporated, or colouring materials may be added and bodies may be shaped from the masses so formed.

It will be understood that in the claims I use the expression "heating" to refer to a temperature which is sufficient to effect the desired polymerization to an adequate extent within a commercially feasible time, e. g. in most cases it will be necessary to heat up to about 60° C. and I prefer to heat at a higher temperature. The ester reaches the viscosity of pure glycerine after heating to 110° C. for 15 hours. The product sets to a glass-like mass in about three days but when making unsplinterable glass it will not be necessary to heat to such a high temperature, since the final stages of the polymerization will be completed while the article is in storage or even in use.

The partially polymerized ester may be dissolved in an organic solvent such as chloroform and the solution may be used to cause adhesion between objects e. g. by painting the surface with the solution and allowing the solvent to evaporate.

The words "an itaconic ester" are used for brevity to describe the di-alkyl esters of itaconic acid or polymerizable esters of itaconic acid derivatives.

I declare that what I claim is:

1. The process of forming composite bodies which consists in making a cement by heating an itaconic ester until it becomes a viscous liquid, using this liquid as a cement and completing the polymerization when the composite mass has been formed.

2. A composite body consisting of sheets of glass and a sheet of cellulose ester united by a polymerized itaconic ester.

3. The process of forming unsplinterable glass which comprises uniting a plurality of sheets of glass and a sheet of cellulose ester by the use of a polymerized itaconic ester.

4. Unsplinterable glass consisting of a plurality of sheets of transparent material united by a polymerized itaconic ester.

In witness whereof, I have hereunto signed my name this 21st day of November, 1925.

EDWARD HOPE.

tent within a commercially feasible time, e. g. in most cases it will be necessary to heat up to about 60° C. and I prefer to heat at a higher temperature. The ester reaches the viscosity of pure glycerine after heating to 110° C. for 15 hours. The product sets to a glass-like mass in about three days but when making unsplinterable glass it will not be necessary to heat to such a high temperature, since the final stages of the polymerization will be completed while the article is in storage or even in use.

The partially polymerized ester may be dissolved in an organic solvent such as chloroform and the solution may be used to cause adhesion between objects e. g. by painting the surface with the solution and allowing the solvent to evaporate.

The words "an itaconic ester" are used for brevity to describe the di-alkyl esters of itaconic acid or polymerizable esters of itaconic acid derivatives.

I declare that what I claim is:

1. The process of forming composite bodies which consists in making a cement by heating an itaconic ester until it becomes a viscous liquid, using this liquid as a cement and completing the polymerization when the composite mass has been formed.

2. A composite body consisting of sheets of glass and a sheet of cellulose ester united by a polymerized itaconic ester.

3. The process of forming unsplinterable glass which comprises uniting a plurality of sheets of glass and a sheet of cellulose ester by the use of a polymerized itaconic ester.

4. Unsplinterable glass consisting of a plurality of sheets of transparent material united by a polymerized itaconic ester.

In witness whereof, I have hereunto signed my name this 21st day of November, 1925.

EDWARD HOPE.

CERTIFICATE OF CORRECTION.

Patent No. 1,644,131.                    Granted October 4, 1927, to

EDWARD HOPE.

It is hereby certified that the name of the assignee in the above numbered patent was erroneously written and printed as "Frederick William Attack" whereas said name should have been written and printed as "Frederick William Atack", as shown by the records of assignments in this office; and that the said Letters Patent should be read with this correction therein that the same may conform to the record of the case in the Patent Office.

Signed and sealed this 6th day of December, A. D. 1927.

Seal.

,M. J. Moore,
Acting Commissioner of Patents.

CERTIFICATE OF CORRECTION.

Patent No. 1,644,131.                        Granted October 4, 1927, to

EDWARD HOPE.

It is hereby certified that the name of the assignee in the above numbered patent was erroneously written and printed as "Frederick William Attack" whereas said name should have been written and printed as "Frederick William Atack", as shown by the records of assignments in this office; and that the said Letters Patent should be read with this correction therein that the same may conform to the record of the case in the Patent Office.

Signed and sealed this 6th day of December, A. D. 1927.

Seal.                                                                        ,M. J. Moore,
                                                                                 Acting Commissioner of Patents.